US00RE39252E

(19) United States
(12) Reissued Patent
Dalvi

(10) Patent Number: US RE39,252 E
(45) Date of Reissued Patent: Aug. 29, 2006

(54) INSTRUCTION DEPENDENT CLOCK SCHEME

(75) Inventor: Vishram P. Dalvi, Folsom, CA (US)

(73) Assignee: Intel Corporation, Santa Clara, CA (US)

(21) Appl. No.: 10/326,169

(22) Filed: Dec. 23, 2002

Related U.S. Patent Documents

Reissue of:
(64) Patent No.: 6,167,529
Issued: Dec. 26, 2000
Appl. No.: 09/001,082
Filed: Dec. 30, 1997

(51) Int. Cl.
*G06F 1/04* (2006.01)

(52) U.S. Cl. ..... 713/501; 713/322; 712/229
(58) Field of Classification Search ..... 713/500, 713/501, 322, 323; 712/23, 41, 208, 210, 712/226, 229
See application file for complete search history.

(56) References Cited

U.S. PATENT DOCUMENTS 5,247,656 A * 9/1993 Kabuo et al. ..... 713/501
6,018,796 A * 1/2000 Suzuki et al. ..... 712/42

* cited by examiner

*Primary Examiner*—Lynne H. Browne
*Assistant Examiner*—Thuan Du
(74) *Attorney, Agent, or Firm*—Pearl Cohen Zedek Latzer, LLP

(57) ABSTRACT

A method and apparatus including a first circuit configured to receive multiple instructions including a first instruction having a first execution time, and to generate a first signal having a state dependent on the first execution time; a second circuit configured to receive the first signal and to generate a clock signal including a clock cycle having a period dependent on the state of the first signal; and a third circuit configured to receive the clock signal and execute a portion of the first instruction during the clock cycle, the first execution time corresponding to the portion of the first instruction.

25 Claims, 2 Drawing Sheets

INSTRUCTION DEPENDENT CLOCK SCHEME

Matter enclosed in heavy brackets [ ] appears in the original patent but forms no part of this reissue specification; matter printed in italics indicates the additions made by reissue.

*CROSS-REFERENCE TO RELATED APPLICATIONS*

*U.S. patent application Ser. No. 10/888,993, filed Jul. 13, 2004, is a divisional reissue application of this application.*

BACKGROUND OF THE INVENTION

1. Field of the Invention

The present invention relates to the field of microprocessors and microprocessor-based devices, such as flash memories; more particularly, the present invention relates to a method and apparatus for adjusting a clock period for a particular cycle dependent on one or more instructions to be performed during that cycle.

2. Description of Related Art

Microprocessors (including microcontrollers) execute instructions at a speed governed by the period of a clock signal. The performance of a microprocessor is generally increased by reducing the period (increasing the frequency) of the clock signal. As the clock period is reduced, the time allocated to perform each step of an instruction is reduced, thereby increasing performance. If the delay of the circuit used to perform a particular step of an instruction (execution time) is longer than the clock period, the results of that step will not be completed before the end of the clock period, thereby leading to malfunction. Thus, the minimum clock period is limited by the maximum execution time of any step of any instruction in the instruction set.

In a pipelined microprocessor, instructions are performed in multiple steps, such as a fetch cycle (in which instructions are retrieved from a memory), a decode cycle (in which instructions are decoded), one or more execute cycles (in instructions are executed) and a writeback cycle (in which results of the instructions are written in the memory). At a given time, one instruction may be fetched, a second instruction may be decoded, a third instruction may be executed, and the result of a fourth instruction may be written back. Since each of these steps are performed during a period of the clock signal (a clock cycle), the minimum clock period is the longest execution time of any step for all the instructions in the microprocessor's instruction set.

If the clock period is shorter than the longest execution time, the steps of instructions that have execution times greater than the clock period would not be completed in a clock cycle. If such an instruction is executed with a clock period that is not long enough to allow all its steps to complete, the microprocessor malfunctions.

The clock period is set at the longest execution time to allow the microprocessor time to complete all its steps but to reduce the time after the execution of the last step but before the end of the clock period. If the clock period is longer than the longest execution time, performance is reduced. In such a case, even the step with the longest execution time is completed a time before the end of the period. Thus, the circuit performing that step is idle for that time.

The steps of instructions are generally split up so that the execution times are approximately the same. If some execution times are much longer than the others, the clock period is set to be at the longest execution time, which is much longer than the others. Thus, when a circuit executes steps with shorter execution times, it is idle for much of the clock period.

If microprocessor instruction set includes an instruction having a step with an execution time that is larger than the longest execution time of any step for all the rest of the instructions in the microprocessor instruction set, the step is often split into two or more steps such that that step has an execution time that more closely matches the others. For example, if the execution time for a step of one instruction is 19 nanoseconds (ns) and the longest execution time of any step for all the rest of the instructions in the microprocessor instruction set is 10 ns, the minimum period of the microprocessor is 19 ns. If the step having an execution time of 19 ns is split into two steps each having an execution time of 9.5 ns, the minimum period of the microprocessor is reduced from 19 ns to 10 ns. In such a case, the performance increase associated with the reduction in the minimum period (19 ns to 10 ns) generally outweighs the performance decrease associated with the single 19 ns step that is split into two 10 ns steps (19 ns to 20 ns latency).

In some cases, splitting a step into two or more steps may not be desirable. For example, if the execution time for a step of one instruction is 12 nanoseconds (ns) and the longest execution time of any step for all the rest of the instructions in the microprocessor's instruction set is 10 ns, the minimum period of the microprocessor is 12 ns. If the step having an execution time of 12 ns is split into two steps each having an execution time of 6 ns, the minimum period of the microprocessor is reduced to 10 ns. In such a case, the performance increase associated with the reduction in the minimum period (12 ns to 10 ns) may not outweigh the performance decrease associated with the 12 ns step that is split into two 10 ns steps (12 ns to 20 ns delay).

What is needed is a method and apparatus to reduce the idle time of execution units in a microprocessor.

SUMMARY OF THE INVENTION

A method and apparatus including a first circuit configured to receive multiple instructions including a first instruction having a first execution time, and to generate a first signal having a state dependent on the first execution time; a second circuit configured to receive the first signal and to generate a clock signal including a clock cycle having a period dependent on the state of the first signal; and a third circuit configured to receive the clock signal and execute a portion of the first instruction during the clock cycle, the first execution time corresponding to the portion of the first instruction.

DETAILED DESCRIPTION

The present invention is a method and apparatus to reduce the idle time of execution units in a microprocessor. The present invention is a method and apparatus to provide a clock signal including a clock cycle having a period dependent on the execution times of the steps of the instructions to be executed in that clock cycle. Thus, the period of each clock cycle more closely matches the execution time of the instructions to be performed by a unit in that clock cycle.

Figure 1:
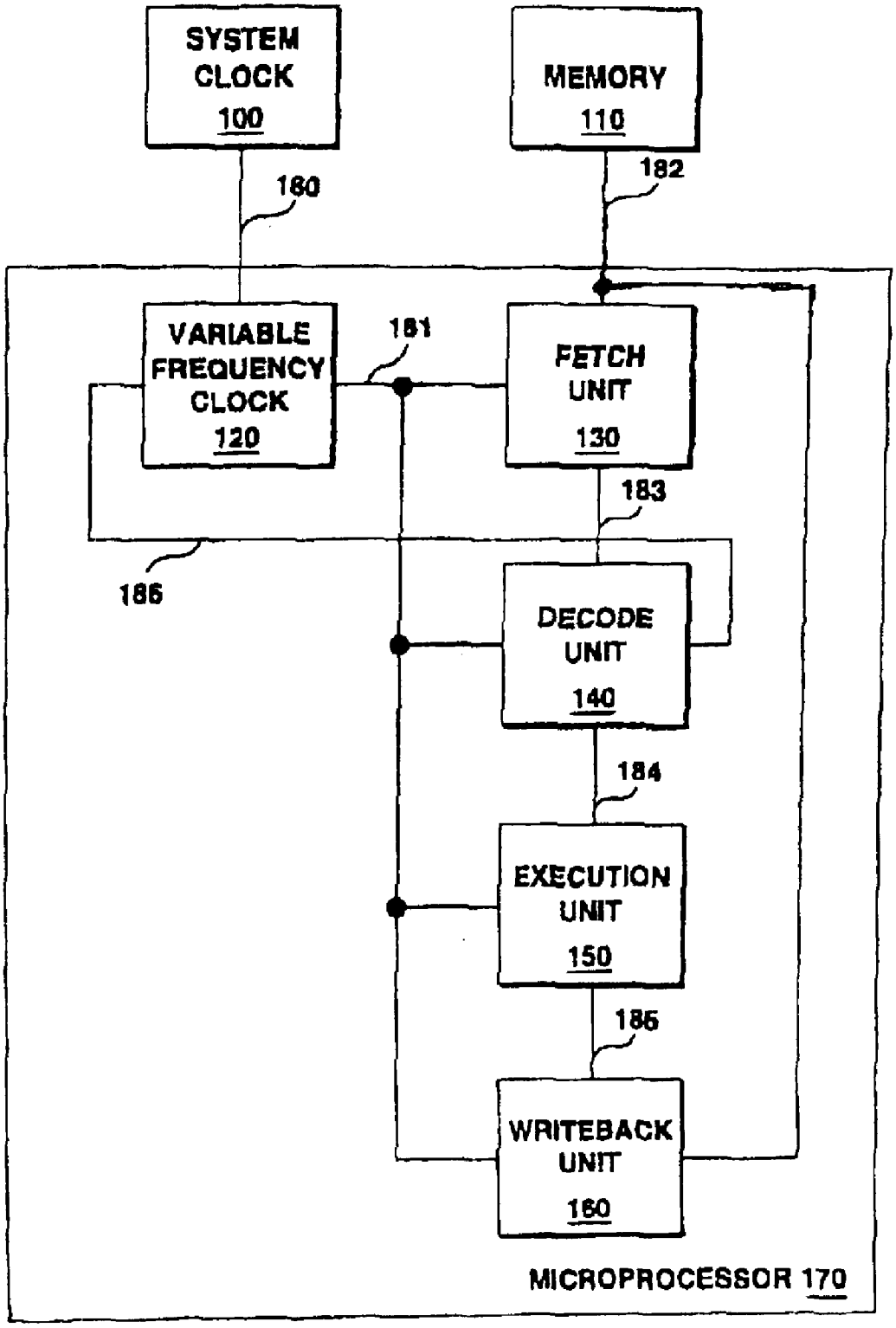
FIG. 1 illustrates one embodiment of a system and apparatus of the present invention.

In FIG. 1, one embodiment of an apparatus of the present invention is illustrated.

A microprocessor 170 comprises a variable frequency clock 120 that generates a clock signal that has clock cycles of a period dependent on the state of a control signal. The variable frequency clock 120 receives the control signal on the bus 186 and generates the clock signal on a bus 181 that is coupled to a fetch unit 130, a decode unit 140, an execution unit 150, and a writeback unit 160. The control signal on the bus 186 is generated by the decode unit 140 based on at least one of the instructions received on a bus 182.

The fetch unit 130 is configured to retrieve instructions from a memory coupled to the bus 182 and provide those instructions on a bus 183 in response to the clock signal. The decode unit 140 is configured to decode the instructions on the bus 183 and provide the decoded instruction on a bus 184 in response to the clock signal. The execution unit 150 is configured to receive the decoded instruction on the bus 184 and execute the instruction to produce a result on a bus 185 in response to the clock signal. The writeback unit 160 is configured to receive the result and transfer that result to the memory in response to the clock signal. In any given clock cycle, the fetch unit 130, the decode unit 140, the execution unit 150, and the writeback unit 160 may be executing portions of different instructions. In some clock cycles, one or more of the units may be idle.

Each of these units completes a portion (step) of the execution of an instruction, if any, during a clock cycle. Thus, the minimum period for that particular clock cycle would be the longest execution time of the portions of the instructions being performed by each unit in that clock cycle.

TABLE 1

| | Clock Cycle | | | | | |
|---|---|---|---|---|---|---|
| | 1 (10 ns) | 2 (10 ns) | 3 (10 ns) | 4 (12 ns) | 5 (10 ns) | 6 (10 ns) |
| Instr. 1 | Fetch (10 ns) | Decode (9 ns) | Execute (10 ns) | Writeback (10 ns) | | |
| Instr. 2 | | Fetch (10 ns) | Decode (9 ns) | Execute (12 ns) | Writeback (10 ns) | |
| Instr. 3 | | | Fetch (10 ns) | Decode (9 ns) | Execute (10 ns) | Writeback (10 ns) |
| Instr. 4 | | | | Fetch (10 ns) | Decode (9 ns) | Execute (10 ns) |

Table 1 illustrates one embodiment of the execution pipeline for a sequence of four instructions. The columns (read left to right) correspond to a sequence of individual clock cycles and the rows correspond to individual instructions. For example, in clock cycle 2 (having a minimum period indicated in parenthesis at the column header), the decode step of the first instruction (having an execution time indicated in parenthesis) and the fetch step of the second instruction (having an execution time indicated in parenthesis) are executed.

In the first clock cycle, the fetch unit 130 performs a fetch step for the first instruction and the decode unit 140, the execution unit 150, and the writeback unit 160 are idle. The minimum period for that particular clock cycle is the maximum execution time of the fetch step of the first instruction (10 ns). Thus, the minimum period for the first clock cycle is 10 ns.

In the second clock cycle, the fetch unit 130 performs a fetch step for the second instruction, the decode unit 140 performs a decode step for the first instruction, and the execution unit 150 and the writeback unit 160 are idle. The minimum period for that particular clock cycle is the maximum execution time of the fetch step of the second instruction (10 ns) and the decode step for the first instruction (9 ns). Thus, the minimum period for the second clock cycle is 10 ns.

In the third clock cycle, the fetch unit 130 performs a fetch step for the third instruction, the decode unit 140 performs a decode step for the second instruction, and the execution unit 150 performs the execution step of the first instruction, and the writeback unit 160 is idle. The minimum period for that particular clock cycle is the maximum execution time of the fetch step of the third instruction (10 ns) and the decode step for the second instruction (9 ns), and the fetch step for the third instruction (10 ns). Thus, the minimum period for the third clock cycle is 10 ns.

In the fourth clock cycle, the fetch unit 130 performs a fetch step for the fourth instruction, the decode unit 140 performs a decode step for the third instruction, and the execution unit 150 performs the execution step of the second instruction, and the writeback unit 160 performs the writeback step for the first instruction. The minimum period for that particular clock cycle is the execution time of the fetch step of the fourth instruction (10 ns), the decode step for the third instruction (9 ns), the execution step of the second instruction (12 ns) and the writeback step of the first instruction (10 ns). Thus, the minimum period for the fourth clock cycle is 12 ns to allow time for the execution step of the second instruction to be completed.

The minimum period of fifth and sixth clock cycles are similarly determined.

In one embodiment, a first predetermined duration is selected such that the execution time of any fetch, decode, or writeback step is less than the first predetermined duration and a second predetermined duration is selected such that execution time of all steps (including execution steps) of all instructions in the instruction set are less than the second predetermined duration. The decode unit 140 determines whether the execution step of an instruction received on the bus 183 has an execution time less than the first predetermined duration and generates the control signal on the bus 186 in a first state if the execution time of the execution step is less than a first predetermined duration and a second state if the execution time of the execution step is greater than the first predetermined duration. The variable frequency clock 120 is configured to generate a clock cycle having a period of the first predetermined duration if the control signal is in the first state and a second predetermined duration if the control signal is in the second state. The variable frequency clock 120 generates the clock cycle to be applied to the execution unit 150 when the execution step of that instruction is executed.

In one embodiment, the variable frequency clock 120 is capable of generating a clock cycle having one of three or more periods depending on whether the control signal is in a corresponding one of three or more states. A first predetermined duration is selected such that the execution time of any fetch, decode, or writeback step is less than the first predetermined duration. A third predetermined duration is chosen to be at least as long as the execution time of the longest execution step of any instruction in the instruction set. A second predetermined duration is chosen to be between the first and third predetermined durations. The decode unit 140 determines whether the execution step of an instruction received on the bus 183 generates the control signal on the bus 186 in a first state if the execution time is less than the first predetermined duration, a second state if the execution time is greater than the first predetermined duration but less than a second predetermined duration, and a third state if the execution time is greater than the second predetermined duration. The variable frequency clock 120 is configured to generate a clock cycle having a period of the first predetermined duration if the control signal is in the first state, a second predetermined duration if the control signal is in the second state, and a third predetermined duration if the control signal is in the third state.

In one embodiment, the execution unit has multiple execution pipelines each performing an execution step for an instruction in a particular clock cycle. In another embodiment, the execution unit 150 performs two or more execution steps for at least one instruction. For example, the execution unit 150 may include two stages, the first stage performing first execution step of a second instruction and the second stage performing the second execution step of a first instruction in a particular clock cycle. In a subsequent cycle, the execution unit 150 performs a first execution step of a third instruction and a second execution step of the second instruction. In yet another embodiment, the execution unit has multiple execution pipelines, at least one of the pipelines performing two or more steps for at least one instruction.

The decode unit 140 determines the state of the control signal based on the maximum execution time of the execution steps to be performed by the execution unit 150 in a particular clock cycle. The variable frequency clock 120 generates that clock cycle to be applied to the execution unit 150 when the execution steps for those instructions are executed.

In another embodiment, the execution time (or inactive status) of other units for particular instructions are used to determine the state of the control signal. For example, the first predetermined duration may be selected such that some writeback steps have greater execution times. The decode unit 140 determines the state of the control signal based on the maximum execution time of the steps to be performed by the execution unit 150 and the writeback unit 160 in a particular clock cycle. The variable frequency clock 120 generates that clock cycle to be applied to the execution unit 150 and the writeback unit 160 when the steps for those instructions are executed.

The present invention may be applied to other microprocessor configurations. In addition, the present invention may be applied to any synchronous device in which the execution time of various operations depend on an external input (instruction).

Figure 2:
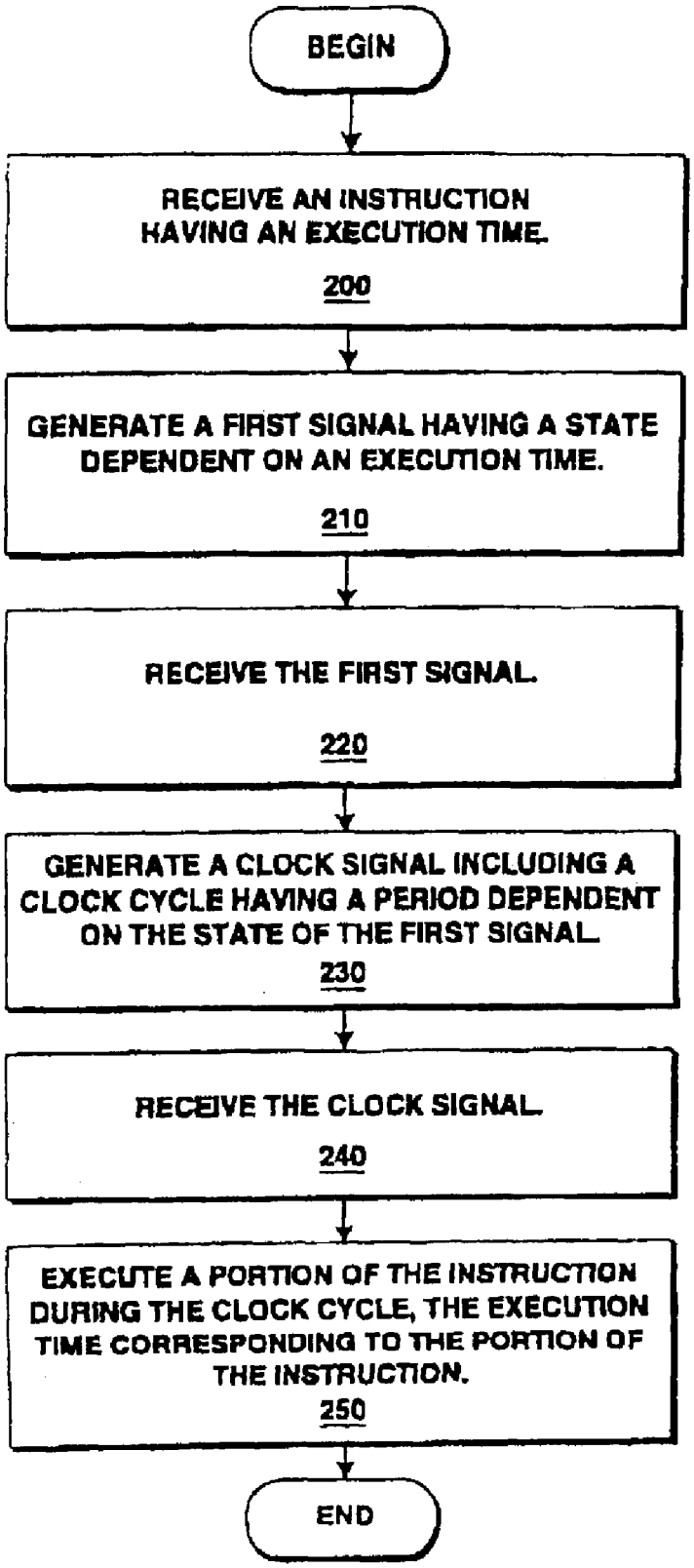
FIG. 2 illustrates one embodiment of a method of the present invention.

FIG. 2 illustrates one embodiment of the method of the present invention.

In step 200, receive an instruction having an execution time. In one embodiment, the execution time is the time to perform a single step of the instruction.

In step 210, generate a first signal having a state dependent on the execution time. In one embodiment, the instruction is decoded to determine whether the execution time corresponding to a step of that instruction is shorter than a first predetermined duration. If the execution time corresponding to a step of that instruction is shorter than a first predetermined duration, the control signal is generated in a first state. Otherwise, the control signal is generated in a second state. Alternatively, the instruction is decoded to determine the shortest one of several predetermined times that is still larger than the execution time of a step of that instruction. The control signal is generated in a state corresponding to the shortest one of several predetermined times that is still larger than the execution time of a step of that instruction. Alternatively, the control signal is generated in a state corresponding to the maximum execution time of the steps to be performed in a particular clock cycle.

In step 220, receive the control signal.

In step 230, generate a clock signal including a clock cycle having a duration dependent on the state of the control signal. In one embodiment, a clock cycle having one of two clock periods (a first and second predetermined duration) is generated. If the control signal is in a first state, a clock cycle having a first predetermined time is generated. If the control signal is in a second state, a clock cycle having a second predetermined time is generated. Alternatively, a clock cycle having one of several clock periods is generated. The clock cycle is generated to have a period corresponding to one of the several states of the control signal. In another embodiment, the clock cycle has a period that varies in relationship to the voltage of the control signal.

In step 240, receive the clock signal.

In step 250, execute a portion of at least one of the instructions during the clock cycle, the at least one of the execution times corresponding to a portion of the at least one of the instructions.

It will be apparent to one skilled in the art that numerous variations of the aforementioned embodiments of the apparatus and method of the present invention may be used. For example, the description above refers to each step of an instruction being performed in a clock cycle. Alternatively, each step of the instruction is performed in a machine cycle of two or more clock cycles. In one embodiment, the period of the clock cycles are varied independently of the other clock cycles in the machine cycle. Thus, the minimum period for each clock cycle would be the longest execution time of the portions of the instructions being performed by each unit in that clock cycle. In another embodiment, the period of all the clock cycles in the machine cycle are the same. Thus, the minimum period for each clock cycle would be the longest execution time of the portions of the instructions being performed by each unit in each clock cycle of that machine cycle.

What is claimed is:

1. A method comprising the steps of:

fetching a first instruction of a plurality of instructions, each of said instructions having execution times for at least one fetch step, at least one decode step, and at least one execution step;

determining whether the execution time of the execution step of the first instruction is less than a first predetermined duration, said first predetermined duration set such that the execution time of any fetch and decode step is less than the first predetermined duration;

if the execution time of the execution step is less than the first predetermined duration, configuring a clock cycle to correspond to the first predetermined duration; and if the execution time of the execution step is not less than the first predetermined duration, configuring the clock cycle to correspond to a second predetermined duration, said second predetermined duration set such that the execution time of any fetch, decode and execution step is less than the second predetermined duration.

2. The method of claim 1 wherein at least one instruction of the plurality of instructions further comprises a writeback step, said first predetermined duration is set such that the execution time for any fetch, decode or writeback step of the plurality of instructions is less than the first predetermined duration, and the second predetermined duration is set such that the execution time for any fetch, decode, execution or writeback step is less than the second predetermined duration.

3. The method of claim 1 wherein at least one instruction of the plurality of instructions further comprises a writeback step, said second predetermined duration is set such that the execution for any fetch, decode, execution or writeback step is less than the second predetermined duration; determination determines whether the writeback step is less than the first predetermined duration and configuring the clock cycle to correspond to the first predetermined duration if the writeback step is less than the first predetermined duration and configuring the clock cycle to correspond to the second predetermined duration if the writeback step is not less than the first predetermined duration.

4. The method of claim 1 further comprising a third predetermined duration set to be shorter than the second predetermined duration and longer than the first predetermined duration.

5. The method of claim 1 further comprising the step of executing the at least one execution step of the first instruction during the configured clock cycle.

6. A method comprising the steps of:

fetching a first instruction, having at least one execution time for at least one step selected from the group consisting of a fetch step, a decode step, an execution step or a writeback step;

decoding the first instruction, and using information derived from the decode to select from at least 2 available clock periods, the selected clock period providing enough time to concurrently execute a combination of steps selected from the group consisting of a fetch step, a decode step, an execution step or a writeback step; and concurrently executing a combination of steps selected from the group consisting of a fetch step, a decode step, an execution step or a writeback step.

7. An apparatus comprising:

means for fetching a first instruction of a plurality of instructions, each of said instructions having execution times for at least one fetch step, at least one decode step, and at least one execution step;

means for determining whether the execution time of the execution step of the first instruction is less than a first predetermined duration, said first predetermined duration set such that the execution time of any fetch and decode step is less than the first predetermined duration, and if the execution time of the execution step is less than the first predetermined duration, a clock cycle is configured to correspond to the first predetermined duration; and if the execution time of the execution step is not less than the first predetermined duration, then the clock cycle is configured to correspond to a second predetermined duration, said second predetermined duration set such that the execution time of any fetch, decode and execution step is less than the second predetermined duration.

8. The apparatus of claim 7 wherein at least one instruction of the plurality of instructions further comprises a writeback step, said first predetermined duration is set such that the execution time for any fetch, decode or writeback step of the plurality of instructions is less than the first predetermined duration, and the second predetermined duration is set such that the execution time for any fetch, decode, execution or writeback step is less than the second predetermined duration.

9. The apparatus of claim 7 wherein at least one instruction of the plurality of instructions further comprises a writeback step, said second predetermined duration is set such that the execution for any fetch, decode, execution of writeback step is less than the second predetermined duration, said determination means determines whether the writeback step is less than the first predetermined duration and configuring the clock cycle to correspond to the first predetermined duration if the writeback step is less than the first predetermined duration and configuring the clock cycle to correspond to the second predetermined duration if the writeback step is not less than the first predetermined duration.

10. The apparatus of claim 7 further comprising a third predetermined duration set to be shorter than the second predetermined duration and longer than the first predetermined duration.

11. The apparatus of claim 7 further comprising the means for executing at least one execution step of the first instruction during the configured clock cycle.

12. The apparatus of claim 7 wherein the apparatus is a microprocessor.

13. An apparatus comprising:

means for fetching a first instruction, having at least one execution time for at least one step selected from the group consisting of a fetch step, a decode step, an execution step or a writeback step;

means for decoding the first instruction and using information derived from the decode to select from at least 2 available clock periods, the selected clock period providing enough time to concurrently execute a combination of steps selected from the group consisting of a fetch step, a decode step, an execution step of a writeback step; and means for concurrently executing a combination of steps selected from the group consisting of a fetch step, a decode step, an execution step or a writeback step.

14. The apparatus of claim 13 wherein the apparatus is a microprocessor.

15. An apparatus comprising:

a fetching unit for fetching a first instruction of a plurality of instructions, each of said instructions having execution times for at least one fetch step, at least one decode step, and at least one execution step;

a decode unit for determining whether the execution time of the execution step of the first instruction is less than a first predetermined duration, said first predetermined duration set such that the execution time of any fetch and decode step is less than the first predetermined duration, and if the execution time of the execution step is less than the first predetermined duration, a clock cycle is configured to correspond to the first predetermined duration; and if the execution time of the execution step is not less than the first predetermined duration, then the clock cycle is configured to correspond to a second predetermined duration, said second predetermined duration set such that the execution time of any fetch, decode and execution step is less than the second predetermined duration.

16. The apparatus of claim 15 wherein at least one instruction of the plurality of instructions further comprises a writeback step, said first predetermined duration is set such that the execution time for any fetch, decode or writeback step of the plurality of instructions is less than the first predetermined duration, and the second predetermined duration is set such that the execution time for any fetch, decode, execution or writeback step is less than the second predetermined duration.

17. The apparatus of claim 15 wherein at least one instruction of the plurality of instructions further comprises a writeback step, said second predetermined duration is set such that the execution for any fetch, decode, execution or writeback step is less than the second predetermined duration, said the decode unit determines whether the writeback step is less than the first predetermined duration and configuring the clock cycle to correspond to the first predetermined duration if the writeback step is less than the first predetermined duration and configuring the clock cycle to correspond to the second predetermined duration if the writeback step is not less than the first predetermined duration.

18. The apparatus of claim 15 further comprising a third predetermined duration set to be shorter than the second predetermined duration and longer than the first predetermined duration.

19. The apparatus of claim 15 further comprising an execution unit for executing at least one execution step of the first instruction during the configured clock cycle.

*20. An apparatus comprising:*

*a decode unit to determine whether an execution time of an execution step of a first instruction is less than a first predetermined duration, said first predetermined duration set such that the execution time of any fetch and decode step is less than the first predetermined duration, and if the execution time of the execution step is less than the first predetermined duration, a clock cycle is configured to correspond to the first predetermined duration; and if the execution time of the execution step is not less than the first predetermined duration, then the clock cycle is configured to correspond to a second predetermined duration, said second predetermined duration set such that the execution time of any fetch, decode and execution step is less than the second predetermined duration.*

*21. The apparatus of claim 20 further comprising a fetch unit to fetch the first instruction of a plurality of instructions, each of said plurality of instructions having an execution time sufficient for at least one fetch step, at least one decode step, and at least one execution step.*

*22. The apparatus of claim 21 wherein at least one instruction of the plurality of instructions further comprises a writeback step, wherein said first predetermined duration is set such that the execution time for any fetch, decode or writeback step of the plurality of instructions is less than the first predetermined duration, and wherein the second predetermined duration is set such that the execution time for any fetch, decode, execution or writeback step is less than the second predetermined duration.*

*23. The apparatus of claim 21 wherein at least one instruction of the plurality of instructions further comprises a writeback step, wherein said second predetermined duration is set such that the execution of any fetch, decode, execution or writeback step is less than the second predetermined duration, and wherein said decode unit determines whether the writeback step is less than the first predetermined duration, configures the clock cycle to correspond to the first predetermined duration if the writeback step is less than the first predetermined duration, and configures the clock cycle to correspond to the second predetermined duration if the writeback step is not less than the first predetermined duration.*

*24. The apparatus of claim 21 further comprising a third predetermined duration set to be shorter than the second predetermined duration and longer than the first predetermined duration.*

*25. The apparatus of claim 21 further comprising an execution unit to execute at least one execution step of the first instruction during the configuration cycle.*

* * * * *